June 24, 1930.  J. E. STEINOUR ET AL  1,768,163
PUSH HOE
Filed July 2, 1929
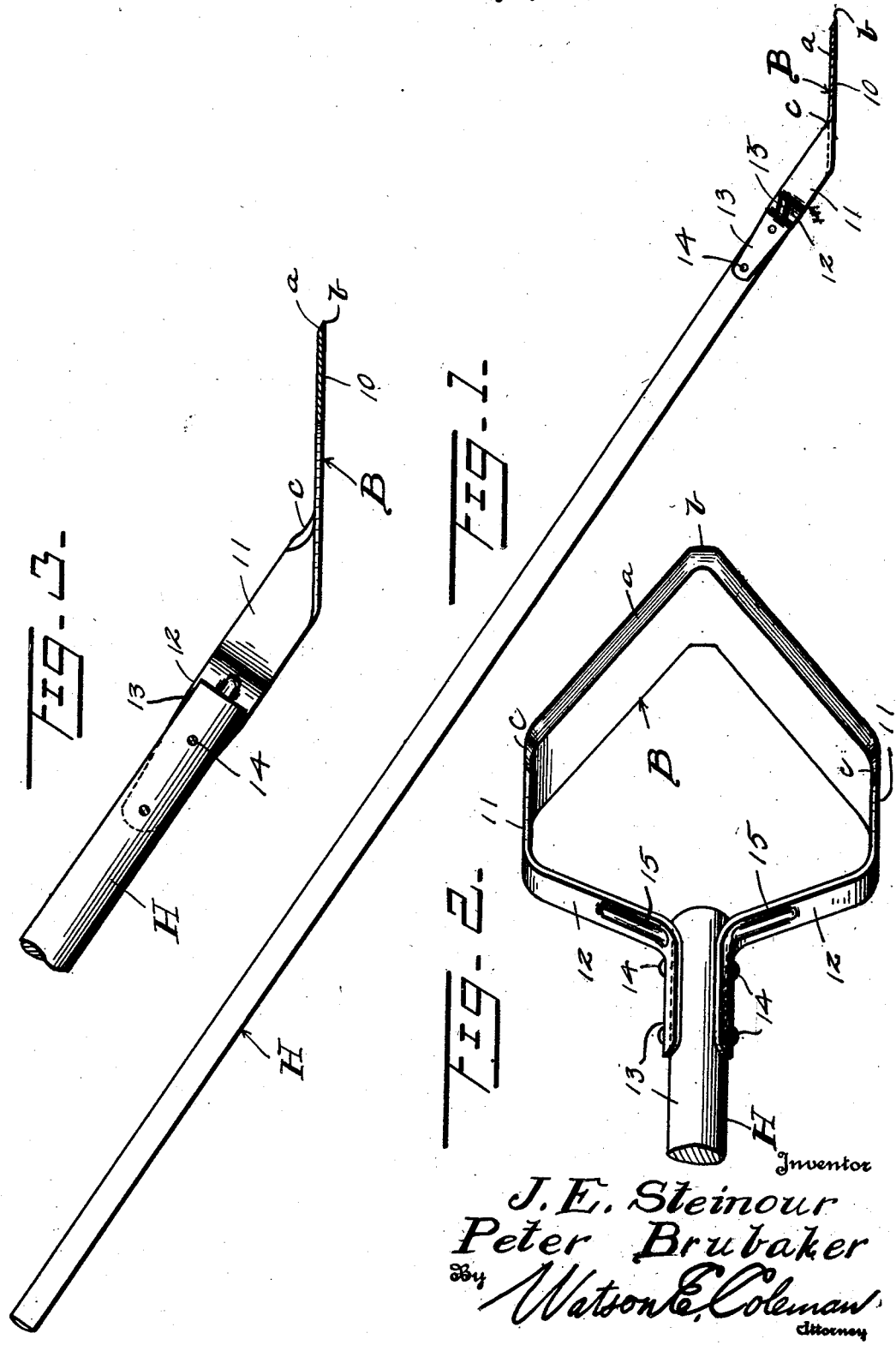
J. E. Steinour
Peter Brubaker
By Watson E. Coleman
Attorney Patented June 24, 1930

1,768,163

UNITED STATES PATENT OFFICE

JOHN E. STEINOUR AND PETER BRUBAKER, OF LOS ANGELES, CALIFORNIA

PUSH HOE

Application filed July 2, 1929. Serial No. 375,372.

This invention relates to a push hoe and it is an object of the invention to provide a device of this kind constructed in a manner whereby the same may be used with the operator at all times in substantially an upright position and which in its use will not have a tendency to throw dirt back upon the operator.

Furthermore, it is an object of the invention to provide a hoe of this kind constructed in a manner whereby it can be effectively used as a spade for light work and provided with means to permit the foot to be used to dig deep or cut sod.

An additional object of the invention is to provide a hoe of this kind wherein the cutting blade is substantially V-shaped with its side portions disposed on an acute angle to assure an effective drawing cut as the blade is pushed ahead and to allow shearing of a weed or kindred growth.

The invention also has for an object to provide a hoe of this kind wherein the cutting blade is of a V formation with its point blunt to assure a square striking of a large weed or kindred growth encountered in the working of a lawn or garden without cutting the grass or plants.

A still further object of the invention is to provide a hoe of this kind wherein the rear portions of the V-shaped cutting blade are disposed upwardly, the lower extremities of said portions being provided with cutting edges so that the hoe will cut clean any trash or sod and also to permit the hoe when turned over on a side to readily pass between closely adjacent plants to effectively cut weeds and cultivate the soil.

In addition such upstanding portions serve as guides to keep the hoe when in use from sliding sideways while cutting and also to show where the hoe is working when the blade proper is underground, thus minimizing the liability of cutting the plants.

The invention also contemplates for an object the provision of a V-shaped blade having its rear extremities disposed upwardly, said upwardly disposed portions having cutting edges whereby the device can be employed to advantage to trim a lawn close to a sidewalk or fence and more especially when the hoe is turned on a side.

It is a still further object of the invention to provide a hoe of this kind constructed in a manner whereby the implement when inverted or turned upside down can be readily forced into the soil for a considerable distance to permit the soil to be loosened and turned over by a slight turning movement of the implement.

The construction of the hoe also is such to permit the same when inverted or turned upside down to be used to open a furrow for small seed and when in its normal position to cover the furrow upon backward movement of the hoe.

An additional object of the invention is to provide a hoe of this kind which, except for the operating handle, is made from a single piece of material to provide a V-shaped cutting blade and the upright portion, the relative arrangement of such parts being such to provide good clearance for soil and weeds to pass through clean.

The invention consists in the details of construction and in the combination and arrangement of the several parts of our improved push hoe whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in side elevation of a push hoe constructed in accordance with an embodiment of our invention;

Figure 2 is a view in top plan of the device as herein disclosed with the operating handle in fragment;

Figure 3 is an enlarged view partly in section and partly in side elevation of the device as herein embodied.

As herein disclosed, our improved hoe comprises a V-shaped cutting blade B together with an elongated handle member H.

The apex portion of the blade B is forwardly disposed and the diverging arms 10 thereof are coplanar and arranged on an acute angle one with respect to the other. The blade B proper is flat with the arms 10 thereof relatively broad. The forward marginal portions of the blade B are formed to provide the cutting edges a and, as is particularly illustrated in Figure 2, it is to be noted that the forward or apex portion b of the blade B is blunt to provide a pronounced substantially straight edge.

The rear extremities of the arms 10 of the blade B are continued by the upwardly and rearwardly extended side arms 11, the flat faces of which being substantially at right angles to the flat faces of the arms 10 and which relative arrangement is accomplished by giving each of the arms 11 a quarter turn with respect to the associated arm 10.

As is also clearly illustrated in Figure 2 of the drawing, it is to be noted that the arms 11 are in parallelism and extend entirely across the outer ends of the arms 10. The knife edges a are also continued, as indicated at c, a slight distance upwardly of the forward edges of the arms 11.

The upper extremities of the arms 11 are continued by the inwardly disposed and upwardly inclined arms 12 terminating in the upwardly disposed and substantially parallel arms 13. These arms 13 are adapted to receive therebetween the lower end portion of a handle member H and secured thereto by rivets 14 or the like. Each of the arms 13 is arcuate in cross section so as to have close contact with the periphery of the handle member H. In practice, it has been found that this particular method of attaching the blade B to the handle member H is more effective than with the use of a conventional ferrule. This is due to the fact that the handle member H at its connection with the blade B will readily and quickly dry out and also such arms 13 will hold the adjacent portion of the handle member H from splitting.

To assure a maximum of strength the arms 12 adjacent to the attaching arms 13 are provided therealong with the beads or corrugations 15. It is to be understood that the handle member H is of a length to permit the hoe to be employed with the operator in a substantially normal upright posture and with the blade B, or more particularly the arms 10 thereof, lying substantially flat upon the soil an effective cultivation of a flower garden can be accomplished and in a manner permitting working close up to the plants. It is to be understood that by having the arms 10 arranged on an acute angle one with respect to the other a drawing cut is assured as the blade is pushed ahead resulting in shearing of weeds and kindred plants.

The blunt end b of the blade B is of advantage as it permits the hoe to strike squarely a large weed or the like and also to cut dandelions, foxtail and the like out of the lawn or garden without unduly cutting the grass or plants.

In the normal operation of the hoe, that is to say with the arms 10 in substantially a flat or horizontal position, the knife edges c provided on the arms 11 will cut clean any trash or sod. It is also to be stated that these knife edges c when the blade B is turned in an upright position permit the hoe to work between closely adjacent plants to cut weeds and cultivate the soil. It is to be further noted that these arms 11 serve as guides to keep the blade B from sliding sideways and also to show just where the blade B is working if under the top of the soil to keep from cutting plants.

With the blade B turned upon a side the resultant lower cutting edge c will assure an effective trim of a lawn close to a sidewalk or fence.

The relative arrangement of the arms 11 and 12 and the attachment through the medium of the arms 13 with the handle member H permits the device to be effectively used as a spade for light work and when so used a foot of the operator may be employed in connection with either of the arms 12 to dig deep or cut sod. With the blade turned upside down it can be used very readily to loosen and turn over soil. With the blade B inverted the forward or apex portion thereof can be readily and conveniently used to form a furrow in the soil for small seed, and with said blade B in the position as illustrated in Figure 1 with the apex portion thereof slightly raised a backward movement of the implement will operate effectively to cover the seed.

It is to be particularly noted that the arms 10, 11, 12 and 13 are formed from one piece of material and are cut out of sheet metal properly shaped and it is believed to be obvious that the central openings defined by the arms 10, 11 and 12 give good clearance for soil, weeds and the like to clearly pass through. It is also believed to be clearly apparent that the hoe in its use will not throw dirt back upon the operator.

From the foregoing description it is thought to be obvious that a push hoe constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

A push hoe comprising a V-shaped blade having its arms arranged on an acute angle one with respect to the other, the rear portions of said arms being continued by upwardly and rearwardly inclined arms, the forward margins of the first named arms and the lower portions of the second named arms being formed into knife edges, said second arms being continued by inwardly disposed arms terminating in outstanding arms, a handle member having an end portion disposed between the last named arms, and means for attaching said last named arms to the handle member, the forward apex portion of the blade being blunt and providing a straight edge substantially at right angles to the handle member.

In testimony whereof we hereunto affix our signatures.

JOHN E. STEINOUR.
PETER BRUBAKER.